United States Patent [19]

Durif

[11] Patent Number: 4,961,453

[45] Date of Patent: Oct. 9, 1990

[54] WHEEL RIM FOR A REVERSED HOOKED TIRE

[75] Inventor: Pierre Durif, Volvic, France

[73] Assignee: Compagnie Generale Des Etablissements Michelin-Michelin & Cie, Clermont-Ferrand, France

[21] Appl. No.: 360,441

[22] Filed: Jun. 2, 1989

[30] Foreign Application Priority Data

Jun. 9, 1988 [FR] France .................................. 88 07831

[51] Int. Cl.$^5$ .............................................. B60C 15/06
[52] U.S. Cl. .......................... 152/379.3; 152/DIG. 20
[58] Field of Search .................. 152/379.3, 379.5, 380, 152/381.4, 387, DIG. 20

[56] References Cited

U.S. PATENT DOCUMENTS 4,373,567 2/1983 Declercq ...................... 152/379.3 X

FOREIGN PATENT DOCUMENTS

| 0079454 | 10/1982 | European Pat. Off. . |
| 0156009 | 12/1984 | European Pat. Off. . |
| 2514883 | 10/1976 | Fed. Rep. of Germany ... 152/379.3 |
| 3408953 | 9/1985 | Fed. Rep. of Germany . |
| 3605803 | 1/1987 | Fed. Rep. of Germany ... 152/379.3 |
| 3529510 | 2/1987 | Fed. Rep. of Germany ... 152/DIG. 20 |
| 3529513 | 2/1987 | Fed. Rep. of Germany ... 152/DIG. 20 |
| 333125 | 6/1903 | France . |

*Primary Examiner*—Russell D. Stormer
*Attorney, Agent, or Firm*—Oblon, Spivak, McClelland, Maier & Neustadt

[57] ABSTRACT

A wheel rim includes a collar and a seat separate from the collar. Between the collar and a bead, there is provided, axially in the mounting plane, a clearance which facilitates the mounting of the bead on the inside of the edges of the wheel rim. Then, the seat is inserted which eliminates the mounting clearance and keep the bead centered in relation to the wheel rim.

6 Claims, 3 Drawing Sheets

WHEEL RIM FOR A REVERSED HOOKED TIRE

BACKGROUND OF THE INVENTION

1. Field of the Invention

This invention relates to wheel rims for those tires whose beads rest radially on the inside of the wheel rim.

2. Description of the Related Art

The mounting of these tires, known as reversed hooked tires, on their wheel rims is described in U.S. Pat. No. 4,516,617. However, in practice it has been found that the manipulation illustrated by FIG. 4 of this patent can almost never occur as explained. It is proposed to cause the bead to enter a zone located axially on the inside of the bead seat to serve as a mounting channel. By analogy with the technique for the mounting of tires beaded radially on the outside of the wheel rim, the mounting channel must be placed so that when a section of the bead is placed there, the section located on the diametrically opposite side can get past the edge of the wheel rim. However, the tire itself opposes this manipulation. As can be seen in FIG. 4 of U.S. Pat. No. 4,516,617, to be able to cause the bead to enter the mounting channel, it is necessary to exert a very strong pull on the side wall. In section, it is clearly seen that the latter is stretched, while its natural shape is very rounded as, for example, in FIGS. 3 or 5 of the same U.S. Pat. No. 4,516,617.

This manipulation cannot be facilitated by off-centering (in relation to the axis of rotation) the tread over the entire circumference of the tire because getting past the wheel rim edge on the side diametrically opposite is more difficult or impossible since it is an off-centering in the other direction which would facilitate it. On the other hand, in the case of a reversed hooked tire, to off-center the tread simultaneously facilitates entry into the mounting channel and getting past the edge on the diametrically opposite side. The transposition of the mounting techniques, therefore, is not complete.

Therefore, in practice, during mounting, the portion of the bead already engaged on the inside of the wheel rim remains in axial contact with the edge of the wheel rim, which, at the end of the mounting, causes a considerable deformation by bending and by compression in the bead, as illustrated by FIG. 1 of this description.

This mounting poses still greater difficulties when the portion of the side wall near the bead wire has reinforcements which reduce its flexibility. It is then difficult to cause the bead to enter the deepened part temporarily receiving the bead during its mounting on the seat, and still more difficult to attain the necessary deformations to succeed in mounting without using the wheel rim channel.

SUMMARY OF THE INVENTION

Accordingly, an object of this invention is to provide a novel wheel rim which facilitates the mounting of tires with an inverted bead, i.e., those tires whose beads rest radially on the inside of the wheel rim.

The wheel rim according to the invention comprises, a collar having two symmetrical halves respectively disposed on either side of a median plane transverse to the wheel axis, each of the halves comprising an axially extending annular zone connected to an annular radially inwardly extending rim edge, wherein a reversed hooked tire mounted to the wheel is positioned such that the axially extending zone is axially aligned with and radially inside of the bead. In addition the rim edge is radially aligned with the bead so as to form an axial stop therefor. The wheel rim also comprises an annular seat removably positionable between the bead and the axially extending zone to eliminate a mounting clearance therebetween.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
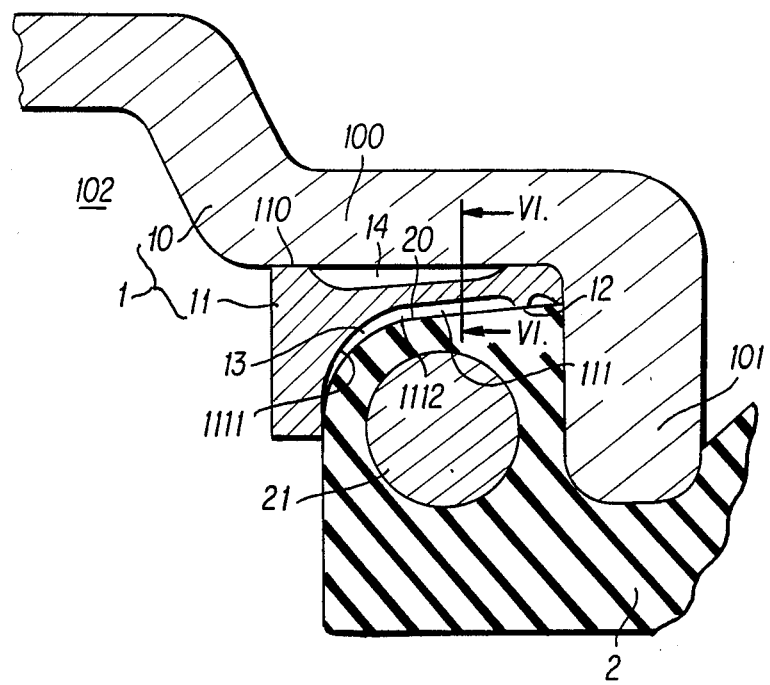
FIG. 2 is a partial meridian sectional view of a wheel rim on which the tire is mounted.
Figure 5:
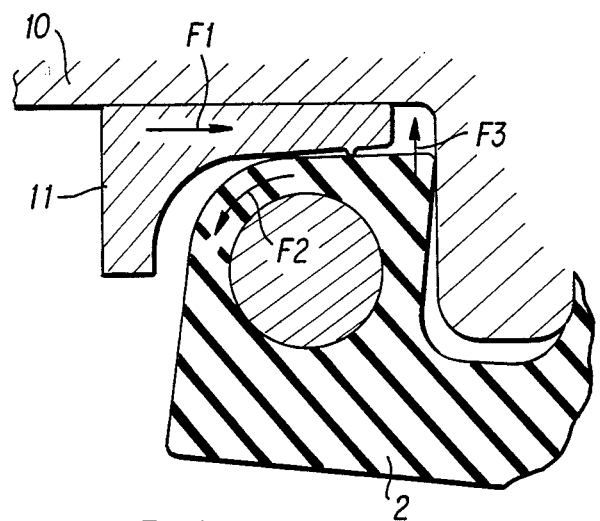
FIG. 3, 4 and 5 illustrate the mounting of the bead.
Figure 3:
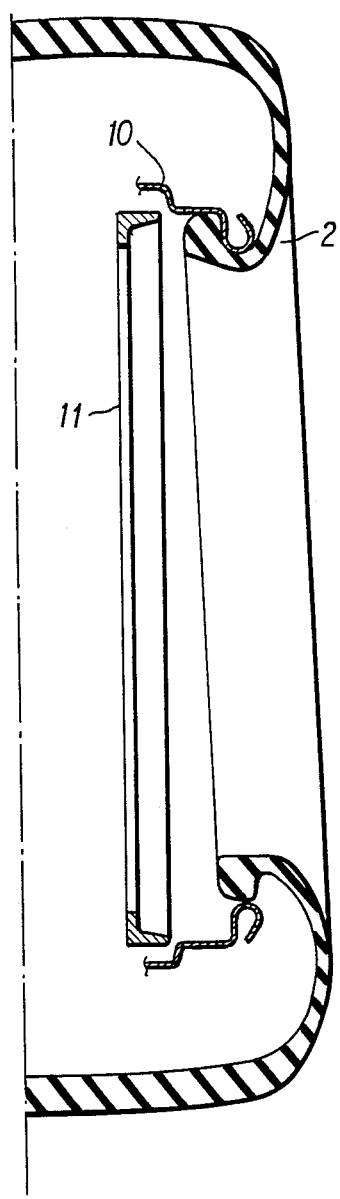
Figure 4:
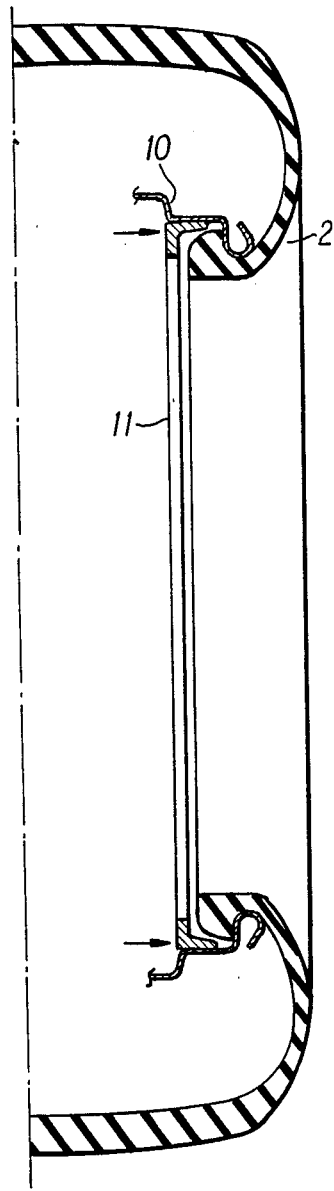

In FIG. 2, a wheel rim 1 on which is mounted a bead 2 of a reversed hooked tire is illustrated. Wheel rim 1 comprises a collar 10 and a seat 11 on each axial side of it. Since the invention relates to the design of the positioning of the support of the bead on its wheel rim, FIGS. 2, 3, 4, and 5 show only a single axial side of the wheel rim. Of course, this suffices for a full understanding of the invention. In the radial extension of bead 2, a zone 100 of collar 10 extends substantially parallel to the axis of rotation, (it corresponds in position to the seat of the wheel rim for a conventional wheel), the zone 100 being extended by a wheel rim edge 101 assuring the precise positioning in the axial direction of bead 2, by a mechanical stop effect. In the radial direction, bead 2 is supported radially by the inside on the seat 11, which is a part separate from collar 10. Collar 10 in relation to bead 2, or bead 2 in relation to collar 10, is designed so as to allow a radial clearance between zone 100 of collar 10 and face 20 of bead 2. The clearance facilitates mounting as shown in FIGS. 3 and 4. To center the tire precisely in relation to wheel rim 1, there is inserted between zone 100 and collar 10 and bead 2 a ring-shaped part of seat 11. This bead seat 11 is itself inserted in collar 10, on the inside of edge 101, by taking advantage of its flexibility and the mounting channel 102 present on wheel rim 1 and/or by designing seat 11 as a slotted elastic ring. The seat 11 is made of steel, but other materials having good mechanical properties could be used.

At the start of the mounting of bead 2, it is positioned in contact with zone 100, which makes it possible to easily get past edge 101 on the diametrically opposite side (FIG. 3). Then (FIG. 4), it suffices to insert seat 11 between bead 2 and zone 100.

Seat 11 has several features which further improve this invention. Thus, the wedge shape of seat 11 (seen in meridian section—FIG. 2) makes it possible to eliminate the clearance while minimizing the insertion force of seat 11. The radially inside face of zone 100 is cylindrical, i.e., parallel to the axis of rotation, and the radially inside face 110 of seat 11 is also cylindrical, with the same diameter.

Quite often, these tires are vulcanized in a position in which their beads are very distant in relation to the mounting position on the wheel rim (see German patent application Ser. No. DE 32 46 624). Manipulating them into a position close to the mounting position, as illustrated by FIG. 3, causes internal stresses which have a tendency to cause the bead to turn beyond its final position (see FIG. 5). To take into account the internal stresses resulting from this production technique, the radially inside face of the seat comprises, going axially from the inside to the outside, a first part 1111 whose meridian section is an arc, connected to a second, tapered part 1112 inclined outward (FIG. 2). This makes a slight rotation of bead 2 around bead wire 21 possible, facilitating the final mount (see FIG. 5). During the insertion of seat 11 along arrow $F_1$, it is necessary that the bead turn as indicated by $F_2$. The arc portion facilitates this movement.

To assure that the unit thus mounted is locked in place, there is provided, on the radially inside surface of seat 11, projecting rough spots 12, located on the axially outside side. During rotation $F_2$ accompanying the insertion of seat 11, at the end of this movement, the bead presses on these rough spots, as shown by arrow $F_3$. It is noted that at least the end of this movement is obtained by inflating the tire. Removal of the seat 11 after deflating is therefore possible. By the arrangement explained, an excellent immobility of seat 11 is attained in relation to collar 10 and in relation to bead 12.

Figure 1:
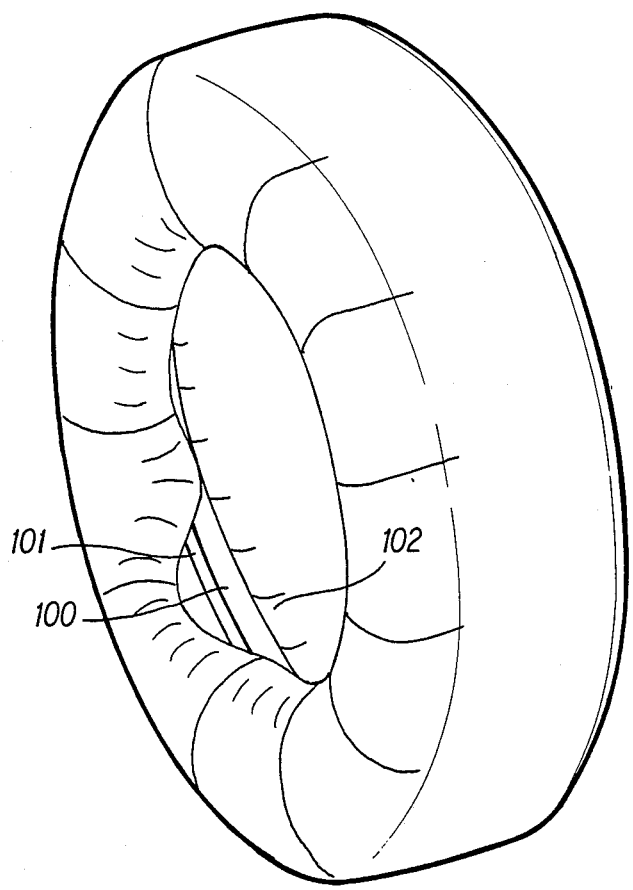
FIG. 1 shows a conventional wheel rim and tire.
Figure 6:
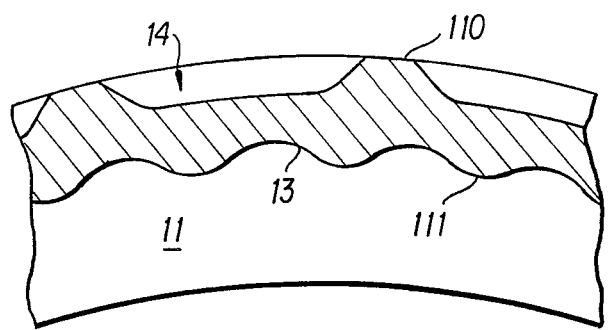
FIG. 6 is a section along line VI—VI in FIG. 2.

To improve the ability of seat 11 to accommodate broad dimensional tolerances of bead 2, without either too great or insufficient a tightening resulting, the actual bearing surface of face 20 of bead 2 can be reduced on surface 111 of seat 11 by providing undulations 13 on seat 11, in the circumferential direction (FIGS. 2 and 6).

To improve the holding of seat 11 on collar 10, the contact pressure can also be increased by providing recess 14 on the radially inside face 110 of seat 11.

Of course, without going outside the scope of this invention, seat 11 can be made circumferentially of several parts. There can also be added any locking arrangement for locking seat 11 axially toward the inside, if necessary.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A wheel rim for a reversed hooked tire comprising:
   a collar having two symmetrical halves respectively disposed on either side of a median plane transverse to the wheel axis, each of said halves comprising an axially extending annular zone connected to an annular radially inwardly extending rim edge, wherein an inverted bead of a tire mounted to the wheel is positioned such that the axially extending zone is axially aligned with, and radially outside of, said bead, said bead having an axially extending tapered surface which faces said axially extending zone, and wherein said rim edge is radially aligned with said bead so as to form an axial stop therefor; and
   a removable annular seat having a radially inner face, said seat extending axially between said axially extending tapered surface of said bead and said axially extending zone.

2. Wheel rim according to claim 1, wherein said zone has a radially inside face and said seat has a radially outside face, the radially inside face of said zone and the radially outside face of said seat both being cylindrical and having the same diameter, and wherein said radially inner face of said seat comprises, in an axially outward direction, a first part whose meridian section is an arc, connected to a second, tapered part inclined axially outward.

3. Wheel rim according to one of claims 1 or 2, wherein the radially inner face of said seat comprises projecting rough spots located on the axially outside side.

4. Wheel rim according to claim 3, wherein the radially inner face of said seat comprises undulations in the circumferential direction.

5. Wheel rim according to claim 4, wherein the radially outside face of said seat comprises recesses.

6. Wheel rim according to claim 1, wherein said removable annular seat axially extends to said axial stop formed by said rim edge.

* * * * *